(No Model.)
I. H. WILLIAMS.
FRUIT OR NUT GATHERER.
No. 412,688. Patented Oct. 8, 1889.
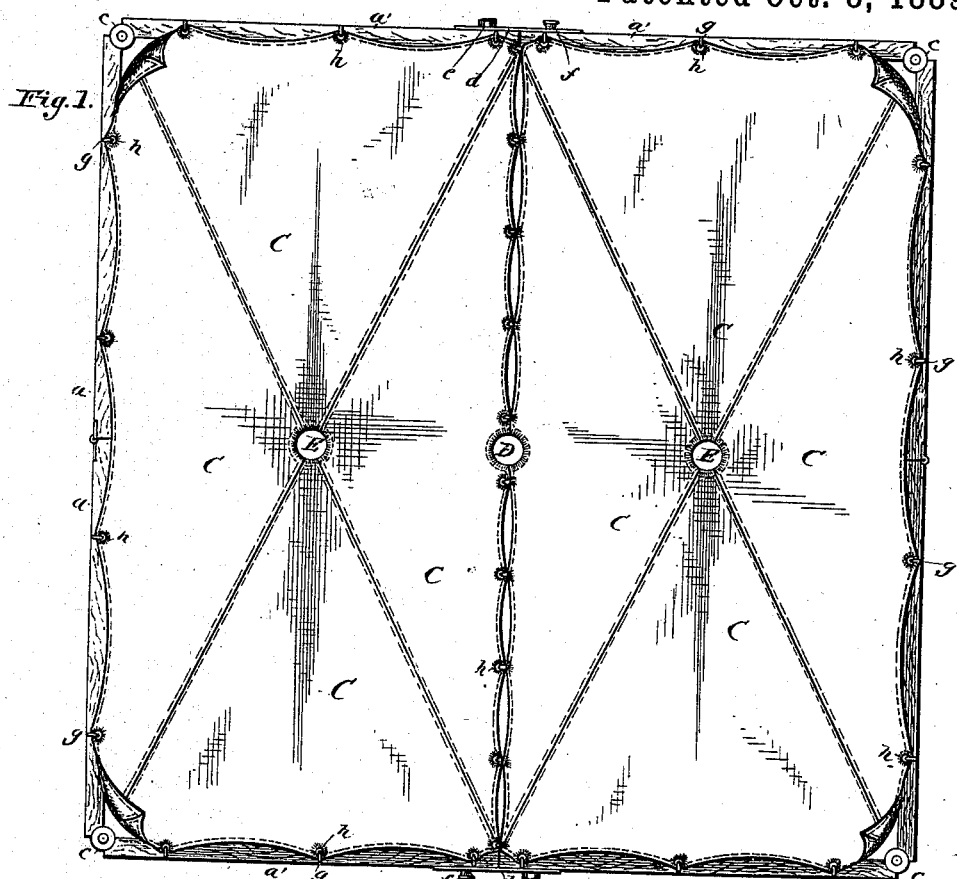
Fig. 1.
Fig. 2.
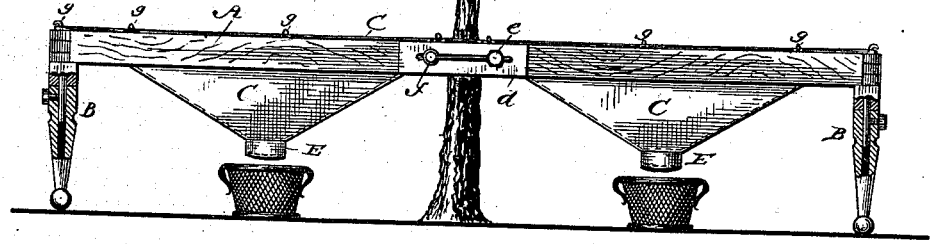
Fig. 3.
Witnesses
H. W. Elmore,
W. L. Hillyer.
Inventor
Ira H. Williams.
By his Attorneys
Finnie & Goldsborough.
N. PETERS, Photo-Lithographer, Washington, D. C.

UNITED STATES PATENT OFFICE.

IRA H. WILLIAMS, OF NEVADA, MISSOURI.

FRUIT OR NUT GATHERER.

SPECIFICATION forming part of Letters Patent No. 412,688, dated October 8, 1889.

Application filed May 10, 1889. Serial No. 310,354. (No model.)

*To all whom it may concern:*

Be it known that I, IRA H. WILLIAMS, a citizen of the United States, residing at Nevada, in the county of Vernon and State of Missouri, have invented certain new and useful Improvements in Fruit or Nut Gatherers, of which the following is a specification.

My invention relates to devices for facilitating the gathering of nuts, fruit, and berries from trees or bushes; and its object is to provide a device of this character which may in use be spread out and stretched beneath the tree or bush whose fruit is to be gathered, to receive the same as it drops therefrom and convey it without injury into baskets or receptacles placed under suitable openings therein, and which, when not in use, may be folded up into small space for storage or packing for transportation.

In the accompanying drawings, illustrating the invention and forming part of this specification, Figure 1 is a plan view of my invention. Fig. 2 is an elevation thereof, and Fig. 3 a view of one side of the frame folded.

In these several figures like letters indicate corresponding parts.

A denotes a frame, preferably rectangular in shape and formed in sections counterparts of each other, two being here shown. Each section (or half in this instance) consists of four or more bars of equal length, the longitudinal ones $a$ being hinged together by ordinary strap-hinges fastened on their outer sides, so that they may fold upon each other outwardly, and the cross-bars $a'$ being hinged to the ends of the longitudinal ones by rule-joint hinges $c$, permitting them to fold inwardly upon the latter, so that all the bars constituting one section of the frame may be folded upon each other and occupy only the length and width of one bar. To the outer ends of the cross-bars of each section are attached the metal plates $d$, by means of which the sections are connected together and formed into one frame when set up for use. These plates are fastened to the cross-bars by headed bolts $e$, and are slotted lengthwise, so that they may be projected beyond the ends of the bars or slid back so as to be flush with the ends thereof for convenience in packing. The other section of the frame is a counterpart of the above, except that, instead of the plates $d$, thumb-screws $f$ are seated in openings near the ends thereof. In use these sections are unfolded and set up around the tree whose fruit is to be gathered, and the ends of the cross-bars are brought together and securely connected by drawing out the plates $d$, lapping them over the abutting ends of the other cross-bars, and screwing the thumb-screws tightly into place through the slots. Thus set up, the frame is supported on legs B, which are preferably adjustable, and is ready to receive the canvases C, now to be described. On their top edges all the bars of the frame are provided with any suitable number of adjustable hooks $g$. The canvases C are, like the sections, counterparts of each other. They are made of one piece of any suitable cloth or other material (or, as shown, of four triangular pieces stretched together) in rectangular form. Upon the outer edges of these canvases are eyeleted holes $h$, by means of which they are stretched upon and fastened to the sections. At their meeting edges the canvases are formed with the opening D, which, when the device is in position for use, is closed tightly around the tree. On the inner edges of the canvases are provided means to fasten them together, there being at this point no frame-bar to which they can be attached. These means may be buttons and button-holes or hooks and eyes, similar to the means for fastening the outer edges to the bar. When the canvas is made in one large piece, a slit is formed from one edge toward and to the center, terminating in the hole D, and the edges of the slit are adapted to be fastened together in the same way. The canvases are formed so that their centers are depressed below their edges, all four sides inclining downward and converging toward the central opening or spout E, through which the fruit falling from the tree runs into a basket or other receptacle thereunder.

Thus constructed, the device is exceedingly simple and easily set up and removed from place to place for use and readily taken apart and packed for storage or transportation in small space. By its use fruit, nuts, berries, &c., may be gathered in large quantities without injury thereto and much time and labor saved. It may be manufactured at small cost and is durable and efficient in use. It may be formed in any shape and of any dimensions and materials.

What I claim, and desire to secure by Letters Patent, is—

1. In a fruit-gatherer of the kind described, a frame formed of sections, each composed of side and end pieces, the former hinged together so as to fold outwardly upon each other, and the latter hinged to the outer ends of the side pieces so as to fold inwardly thereon, and means for fastening the sections together, substantially as described.

2. The combination, to form a fruit-gatherer, of the frame formed of sections adapted to be fastened together and each composed of side and end pieces, the former hinged together so as to fold outwardly upon each other, and the latter hinged to the outer ends of the side pieces so as to fold inwardly thereupon, and the canvases having the discharge-openings in their depressed centers, eyeleted holes along their outer edges adapted to catch over hooks on the frame-bars, and suitable fastenings along their meeting edges, substantially as described.

3. The combination, to form a fruit-gatherer, of the frame adapted to be set up around a tree, formed of sections, each composed of side and end pieces, the side pieces hinged together so as to fold outwardly upon each other, and the end pieces hinged to the outer ends of the side pieces so as to fold inwardly thereupon, slotted plates connected to the ends of the end pieces of one section, and thumb-screws upon the meeting ends of the end pieces of the other section, adjustable legs at the intersection of the side and end pieces of each section, and canvases adapted to be stretched upon the frame to receive the fruit from the tree and having discharge-openings in their depressed centers for the fruit to escape into receptacles therebeneath, eyeleted holes along their outer edges to catch over hooks on the frame-bars, and suitable fastenings along their meeting edges, substantially as described.

I. H. WILLIAMS.

Witnesses:
   E. C. SUMMERFIELD,
   W. B. POMEROY.